United States Patent [19]

Leitch et al.

[11] 4,445,656

[45] May 1, 1984

[54] STAND AND STRAP ARRANGEMENT FOR SUPPORTING AND SECURING PIPES

[76] Inventors: James K. Leitch, 37 Wanless Crescent; Raymond C. Newman, 197 Sheldrake Blvd., both of Toronto, Ontario; Cameron B. Gray, 51 Thornbank Rd., Thornhill, Ontario, all of Canada

[21] Appl. No.: 192,866

[22] Filed: Dec. 8, 1980

[51] Int. Cl.³ .............................................. F16L 3/00
[52] U.S. Cl. .................................... 248/49; 24/23 R; 248/74.1
[58] Field of Search ................... 248/49, 59, 70, 74 R, 248/74 B, 74 A, 62, 274, 499, 500; 24/20 EE, 23 EE, 20 R, 23 R

[56] References Cited

U.S. PATENT DOCUMENTS

| 753,969 | 3/1904 | Fee | 248/62 X |
| 981,769 | 1/1917 | Kinowski | 248/62 |
| 1,158,633 | 11/1915 | Carpenter et al. | 248/59 |
| 1,612,959 | 1/1927 | Zifferer | 248/62 X |
| 2,684,222 | 7/1954 | Miller | 248/49 |
| 3,462,804 | 8/1969 | Renaudin | 248/74 R X |
| 3,523,668 | 8/1970 | Logsdon | 248/59 |
| 3,966,154 | 6/1976 | Perrault et al. | 248/74 B |
| 4,109,350 | 8/1978 | Acre | 24/20 EE X |

Primary Examiner—William H. Schultz
Assistant Examiner—Ramon O. Ramirez

[57] ABSTRACT

A stand and strap arrangement for supporting and securing pipes. The stand has arcuate arms to support the pipe and strap co-operates with the stand to snap into place to secure the pipe to the stand. The stand is secured to the floor and is adjustable with respect to the height in relation to the floor.

3 Claims, 3 Drawing Figures

STAND AND STRAP ARRANGEMENT FOR SUPPORTING AND SECURING PIPES

FIELD OF THE INVENTION

This invention relates to an apparatus for supporting and securing pipes and the like and in particular for supporting and securing air supply pipes for aeration systems.

BACKGROUND OF THE INVENTION

Air supply pipes used in aeration systems are laid in grids and supported off the floor. It is also desirable to maintain the pipes at the same level and to be able to lay such a system quickly and economically due to the size of the aeration systems.

At the present time, the pipes are laid on stands which are adjustably secured to a base which extends upwardly from the floor. The stand is positioned into place at the desired level. After the pipes are laid on the stand a strap is then placed over the pipe and secured by means of nuts and bolts to the stand. Various other supporting and securing means have been used; however, they all have the disadvantage of being time-consuming to install and costly in terms of material required.

It is therefore an object of the present invention to provide a support and securing apparatus which is simple to install and relatively inexpensive in the cost of materials.

SUMMARY OF THE INVENTION

The present invention is directed to an apparatus for supporting and securing pipes and the like and in particular for use in aeration systems.

According to the invention there is provided an apparatus for supporting and securing pipes and the like comprising a stand having two arcuate arms extending outwardly and upwardly away from each other for supporting pipes and the like. The stand has a means for securing to floors and the like. The arcuate arms are connected at one end to the securing means. The ends of the arcuate arms distal from the securing means terminate in first and second flanges respectively. The first and second flanges extend horizontally outwardly. The first flange has a rectangular opening therethrough and the second flange has locking teeth along the underside of the second flange. A strap of generally inverted U-shape is provided for securing the pipes and the like to the stand. One end of the strap has a first tail extending outwardly from and forming an acute angle with the strap. The first tail of the strap is adapted to extend through the rectangular opening of the first flange such that the upper surface of the first tail is juxtaposed to the underside of the first flange. The other end of the strap has a second tail extending inwardly and forming an obtuse angle with the strap. The second tail has teeth along the upper side of the tail for mating with the locking teeth of the second flange.

According to an aspect of the invention the means for securing the stand to floors and the like comprises a hollow stem extending downwardly from the arcuate arms. The stem is internally threaded for threading onto an externally threaded base stem extending upwardly from and secured to the floor.

According to another aspect of the invention the acute angle between the first tail and the strap is substantially between 75° and 85° and the obtuse angle between the second tail and the strap is substantially between 95° and 120°.

BRIEF DESCRIPTION OF THE DRAWINGS

These and other objects and advantages and features of the invention will become apparent in the following detailed description of the preferred embodiments of the invention as shown in the drawings wherein.

DETAILED DESCRIPTION OF THE PREFERRED EMBODIMENTS OF THE INVENTION

Figure 1:
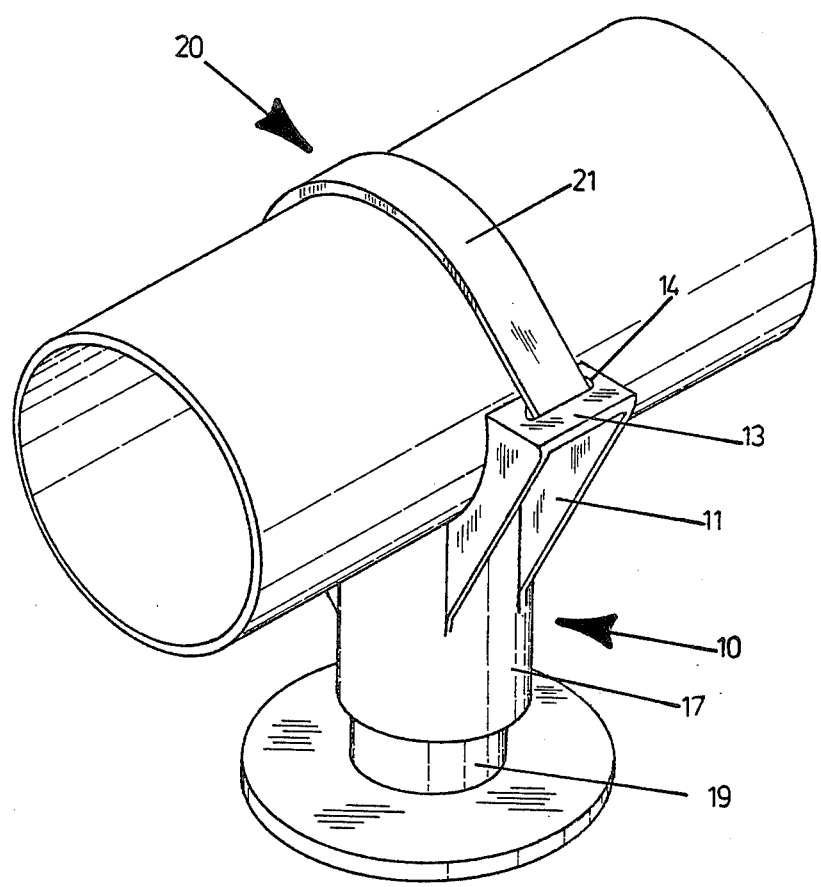
FIG. 1 is a perspective view of the stand and strap supporting and securing a pipe.
Figure 2:
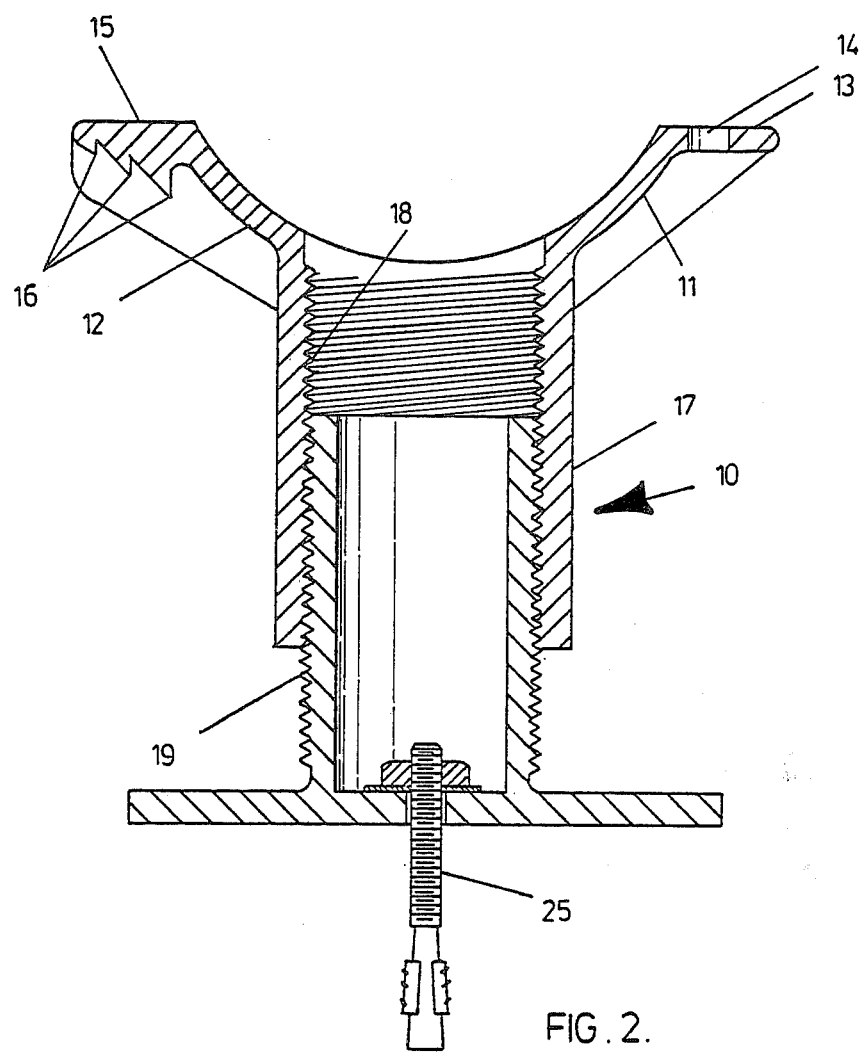
FIG. 2 is a cross-sectional view of the stand.
Figure 3:
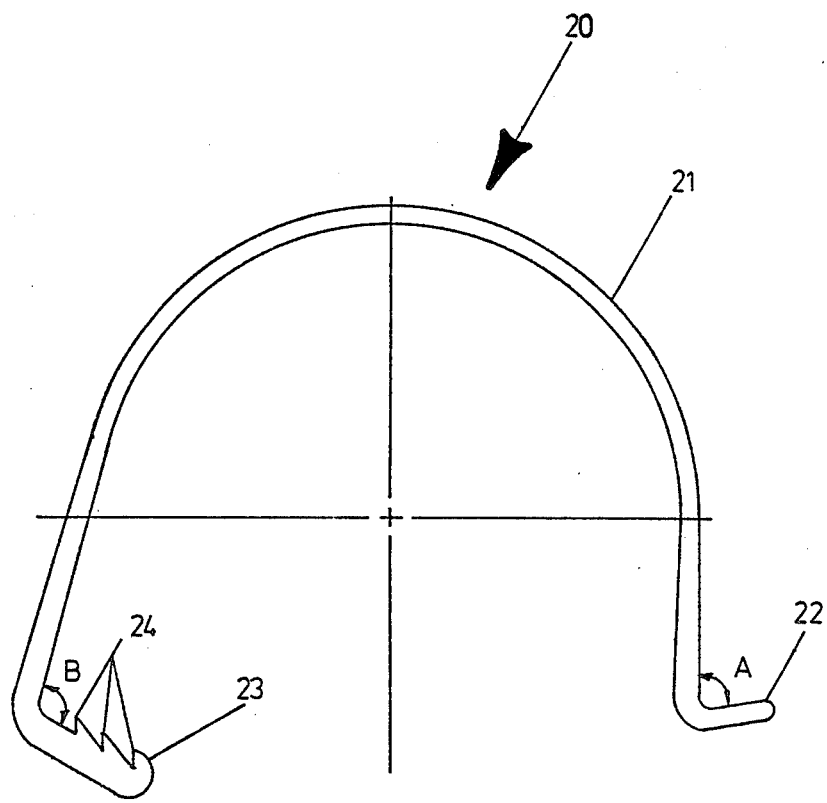
FIG. 3 is a side view of the strap.

With reference to the drawings there is shown a preferred embodiment of the invention wherein the stand is generally designated as 10 comprising two arcuate arms 11 and 12 extending outwardly and upwardly away from each other. The arcuate arm 11 terminates in a horizontally-extending flange 13 having a rectangular opening 14 extending therethrough.

The arcuate arm 12 terminates in a horizontally-extending flange 15 having locking teeth 16 along the underside of the flange 15.

The arcuate arms 11 and 12 are connected to a hollow tubular stem 17 which extends downwardly away from the arcuate arms 11 and 12. The stem 17 is internally threaded as indicated at 18.

An externally-threaded base stem 19 is secured to the floor by means of a suitable anchoring system such as a stainless steel cinch anchor 25.

The stand 10 is secured to the floor by screwing the stand on to the base stem 19. The height of the stand is determined by the extent to which the stand is threaded onto the base stem 19 and is thus adjustable.

The strap which is generally designated as 20 is comprised of a strip of synthetic resinous material which is formed into a generally inverted U-shape 21. One end of strap 20 has a tail 22 which extends outwardly away from the U-shape 21 and forms an acute angle A therewith.

The other end of strap 20 has a second tail 23 which extends inwardly and forms an obtuse angle B with the U-shape 21. The second tail 23 has along its upper side teeth 24 which are adapted to mate with the locking teeth 16 of stand 10.

The tail 22 is adapted to extend through opening 14 of flange 13 and is adapted to be held in place as shown in FIG. 1.

Acute angle A may be in the range of between 75° and 85° and obtuse angle B may be in the range of 95° to 120°.

Although various embodiments of the invention have been illustrated and described it is understood that variations may be made by those skilled in the art without departing from the spirit of the invention and the scope of the appended claims.

The embodiments of the invention in which an exclusive property or privilege are claimed are defined as follows:

1. An apparatus for supporting and securing pipes and the like comprising:
    a stand having two arcuate arms extending outwardly and upwardly away from each other for supporting pipes and the like, means for securing said stand to floors and the like, said arcuate arms connected at one end to said securing means, ends of said arcuate arms distal from said securing means terminating in a first and second flanges respectively, said first and second flanges extending horizontally outwardly, said first flange having a rectangular opening therethrough, said second flange having locking teeth along the underside of said flange, a strap of generally inverted "U" shape for securing pipes and the like to said stand, one end of said strap having a first tail extending outwardly from and forming an acute angle with said strap, said first tail adapted to extend through said rectangular opening such that the upper surface of said first tail is juxtaposed to the underside of said first flange, the other end of said strap having a second tail extending inwardly and forming an obtuse angle with said strap, said second tail having teeth along the upper side of said second tail for mating with said locking teeth of said second flange the arrangement being such that when said first tail of said strap extends through said rectangular opening said teeth of said second tail does not mate with locking teeth of said second flange until downward pressure is applied to said second tail.

2. An apparatus as claimed in claim 1 wherein said securing means comprises a hollow stem extending downwardly from said arcuate arms, said stem being internally threaded for threading on to an externally threaded base stem extending upwardly from and anchored to floors and the like.

3. An apparatus as claimed in claim 2 wherein said acute angle is in the range of between 75° and 85° and said obtuse angle is in the range of 95° and 120°.

* * * * *